United States Patent [19]
Acampora, Jr.

[11] Patent Number: 5,839,834
[45] Date of Patent: *Nov. 24, 1998

[54] BEARING AND BEARING SEAL

[75] Inventor: Salvatore Acampora, Jr., Bristol, Conn.

[73] Assignee: The Torrington Company, Torrington, Conn.

[*] Notice: This patent issued on a continued prosecution application filed under 37 CFR 1.53(d), and is subject to the twenty year patent term provisions of 35 U.S.C. 154(a)(2).

[21] Appl. No.: 722,710

[22] Filed: Sep. 30, 1996

[51] Int. Cl.⁶ ..................................................... F16C 33/78
[52] U.S. Cl. ............................................................. 384/484
[58] Field of Search .................................... 384/484, 486, 384/488, 147, 148

[56] References Cited

U.S. PATENT DOCUMENTS

| | | |
|---|---|---|
| 2,888,304 | 5/1959 | Kooistra . |
| 4,592,666 | 6/1986 | Jornhagen . |
| 4,811,704 | 3/1989 | Boehmer et al. . |
| 4,836,694 | 6/1989 | Schmehr et al. . |
| 4,872,770 | 10/1989 | Dickinson . |
| 4,946,295 | 8/1990 | Hajzler . |
| 5,242,229 | 9/1993 | McLarty . |
| 5,385,352 | 1/1995 | Kurose . |

Primary Examiner—Lenard A. Footland
Attorney, Agent, or Firm—John C. Bigler

[57] ABSTRACT

The antifriction bearing has an annular seal with a metal ring with resilient springs which securely lock the seal into the outer ring annular groove. A polymer ring on the metal ring of the seal is in sealing engagement with the inside surface of the bearing outer ring.

6 Claims, 2 Drawing Sheets

BEARING AND BEARING SEAL

BACKGROUND OF THE INVENTION

This invention relates to antifriction bearings and bearing seals. More particularly, this invention is a new and improved bearing including a novel bearing seal of a particular construction.

Conventionally, a ball bearing or roller bearing includes an inner ring and an outer ring and a seal which is fitted and secured in position by making use of its elasticity. The seal often includes rubber portions which are thick and extend into an annular groove in the inner surface of the outer ring. Because of the interference provided, part of the rubber may get out of the outer race and suffer damage so that the seal no longer functions properly. Also, the rubber portion of the seal which is located in the annular groove may wear during service life and the seal may be loosened due to vibrations or other external forces that may be applied, thereby causing the seal to lose its sealing function.

The foregoing illustrates limitations known to exist in present antifriction bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an inner ring and an outer ring. The outer ring has an inside surface of greater inside diameter than the diameter of the outside surface of the inner ring thereby providing an inner ring-outer ring annulus. The outer ring has an annular groove axially spaced from its axial end by an axially extending portion of the outer ring inside surface. A metal ring is located in the inner ring-outer ring annulus. The metal ring has an axially extending portion with an outside diameter slightly less than the inside diameter of that portion of the inside surface of the outer ring which axially spaces the annular groove from the axial end of the outer ring. A plurality of circumferentially separated resilient locking members are adapted to extend into the outer ring annular groove and securely lock the metal ring in the inner ring-outer ring annulus when the metal ring is inserted. A polymer ring on the metal ring is in sealing engagement with that portion of the inside surface of the outer ring which axially spaces the annular groove from the axial end of the outer ring.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various Figures, like parts are referred to by like numbers.

Figure 1:
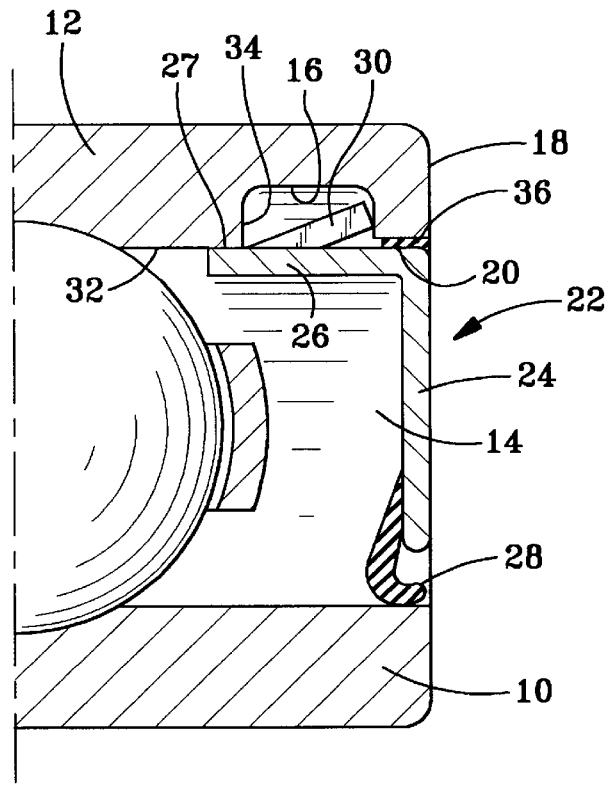
FIG. 1 is a partial transverse section through a preferred embodiment of the invention.
Figure 2:
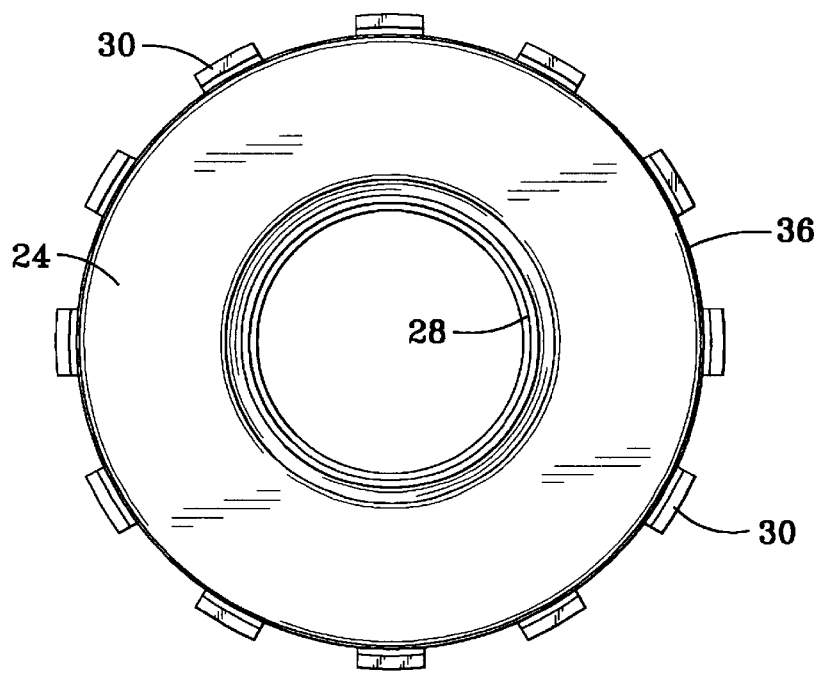
FIG. 2 is front view of the seal of FIG. 1.

Referring to FIG. 1 and FIG.2, the antifriction bearing comprises an inner ring 10 and an outer ring 12. The outer ring has an inside surface of greater inside diameter than the outside surface of the inner ring thereby providing an inner ring-outer ring annulus 14.

The outer ring 12 has an annular groove 16. The annular groove is axially spaced from the outer ring axial end surface 18 by the axially extending portion 20 of the outer ring inside surface.

A metal ring 22 is shown inserted into the inner ring-outer ring annulus 14. The metal ring is generally L-shaped in cross-section and includes a radially extending portion 24 and a cylindrical axially extending portion 26 extending axially across the annular groove 16 and into contact with the outer ring inside surface 27. The inside of portion 24 is radially spaced from inner ring 10. An annular seal 28 is attached to the metal ring portion 24 and is in wiping contact with the inner ring 10.

A plurality of circumferentially separated resilient locking members extend from the cylindrical portion 26 into the annular groove 16 and securely lock the metal ring 24 in the inner ring-outer ring annulus 14 when the metal ring is inserted. In the embodiment of FIG. 1 and FIG. 2, the resilient locking members are springs 30 extending axially outwardly and radially outwardly from the cylindrical portion 26 into locking contact with the annular groove. The springs 30 are stamped out of the metal ring portion 26 and are bent outwardly so that as the metal ring 22 is pushed into the annulus 14, the springs are bent radially inwardly. After the metal ring has been pushed in and fully seated, the springs spring back to their original position and snap into the groove 16.

The axially extending inside surface 32 of the outer race 12 may have an inside diameter slightly less than the inside diameter of inside surface 20. Surface 32 extends from the axially inside surface 34 of the annular groove 16 toward the axial center of the bearing.

A thin flat polymer ring 36 on the metal ring 22 has approximately the same axial length as the axial length of the inside surface portion 20 of the outer ring 12 and is in sealing engagement with portion 20. The polymer ring is bonded to, and encircles cylindrical portion 26 of metal ring 22 to provide a tight seal but does not extend axially into the annular groove 16. Thus, the amount of polymer needed is minimized while still providing an antifriction bearing with a tight seal.

Figure 3:
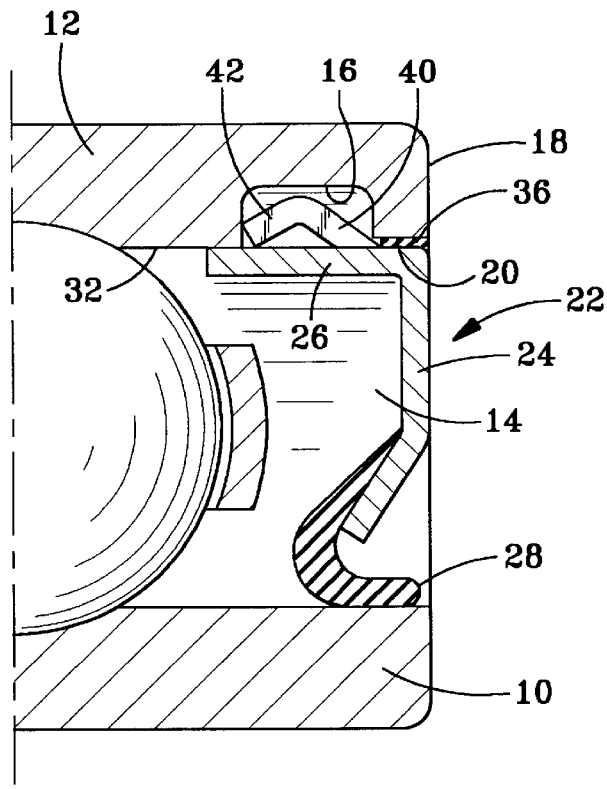
FIG. 3 is a partial transverse section through a second preferred embodiment of the invention.
Figure 4:
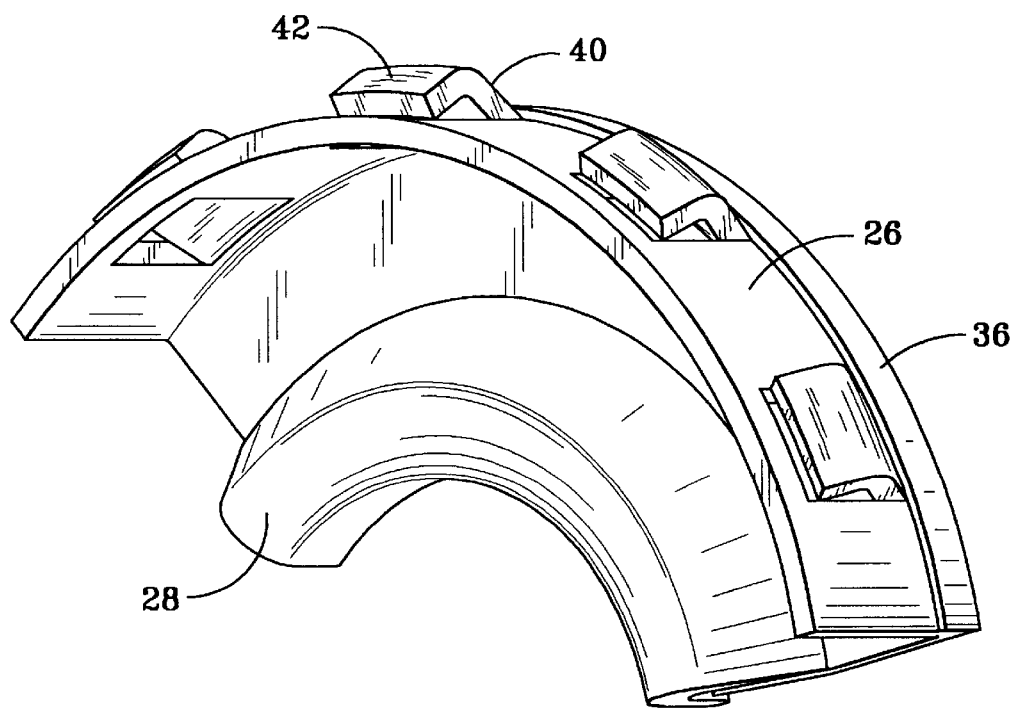
FIG. 4 is a fragmentary perspective view of the seal of FIG. 3.

In the embodiment of FIG. 3 and FIG. 4, the resilient locking members are generally U-shaped springs with one end 40 extending axially inwardly and radially outwardly from the cylindrical axially extending portion 26 of the metal ring 22, and a free end 42 extending axially inwardly and radially inwardly.

Having described the invention, what is claimed is:

1. An antifriction bearing comprising:
   an inner ring;
   an outer ring having an inside surface of greater inside diameter than the diameter of the outside surface of the inner ring thereby providing an inner ring-outer ring annulus, said outer ring having an annular groove axially spaced from the axial end of the outer ring by an axially extending portion of the outer ring inside surface;
   a metal ring in the inner ring-outer ring annulus, said metal ring having an axially extending portion having an outside diameter slightly less than the inside diameter of said portion of the inside surface of the outer ring which axially spaces the annular groove from the axial end of the outer ring and a plurality of circumferentially separated resilient locking members adapted to extend into a portion of the outer ring annular groove and securely lock the metal ring in the inner ring-outer ring annulus when the metal ring is inserted such that the outer ring annular groove provides a lubricant reservoir; and an elastomeric ring on the metal ring in sealing engagement with that portion of the inside surface of the outer ring which axially spaces the annular groove from the axial end of the outer ring such that the lubricant reservoir of the outer ring annular groove is open to the inner ring-outer ring annulus.

2. An antifriction bearing in accordance with claim 1 wherein the elastomeric ring has approximately the same axial length as the axial length of that portion of the inside surface of the outer ring which axially spaces the annular groove from the axial end of the outer ring such that the elastomeric ring does not reduce the lubricant reservoir provided by the outer ring annular groove.

3. An antifriction bearing in accordance with claim 2 wherein:

the axially extending portion of the metal ring is cylindrical and extends axially across the annular groove and into contact with the outer ring inside surface.

4. An antifriction bearing in accordance with claim 3 wherein:

the resilient locking members are springs extending axially outwardly and radially outwardly from the axially extending portion of the metal ring and into engagement with the groove surface.

5. An antifriction bearing in accordance with claim 4 wherein:

the resilient locking members are generally U-shaped springs with one end extending axially inwardly and radially outwardly from the axially extending portion of the metal ring, and a free end extending axially inwardly and radially inwardly.

6. An antifriction bearing in accordance with claim 1 wherein the elastomeric ring is made of a polymer.

* * * * *